3,245,266
PRESSURE TRANSDUCERS
George W. Masters, Jr., Gainesville, Fla., assignor to Electro-Mechanical Research, Inc., Sarasota, Fla., a corporation of Connecticut
Continuation of application Ser. No. 205,318, June 26, 1962. This application Feb. 11, 1965, Ser. No. 438,160
7 Claims. (Cl. 73—407)

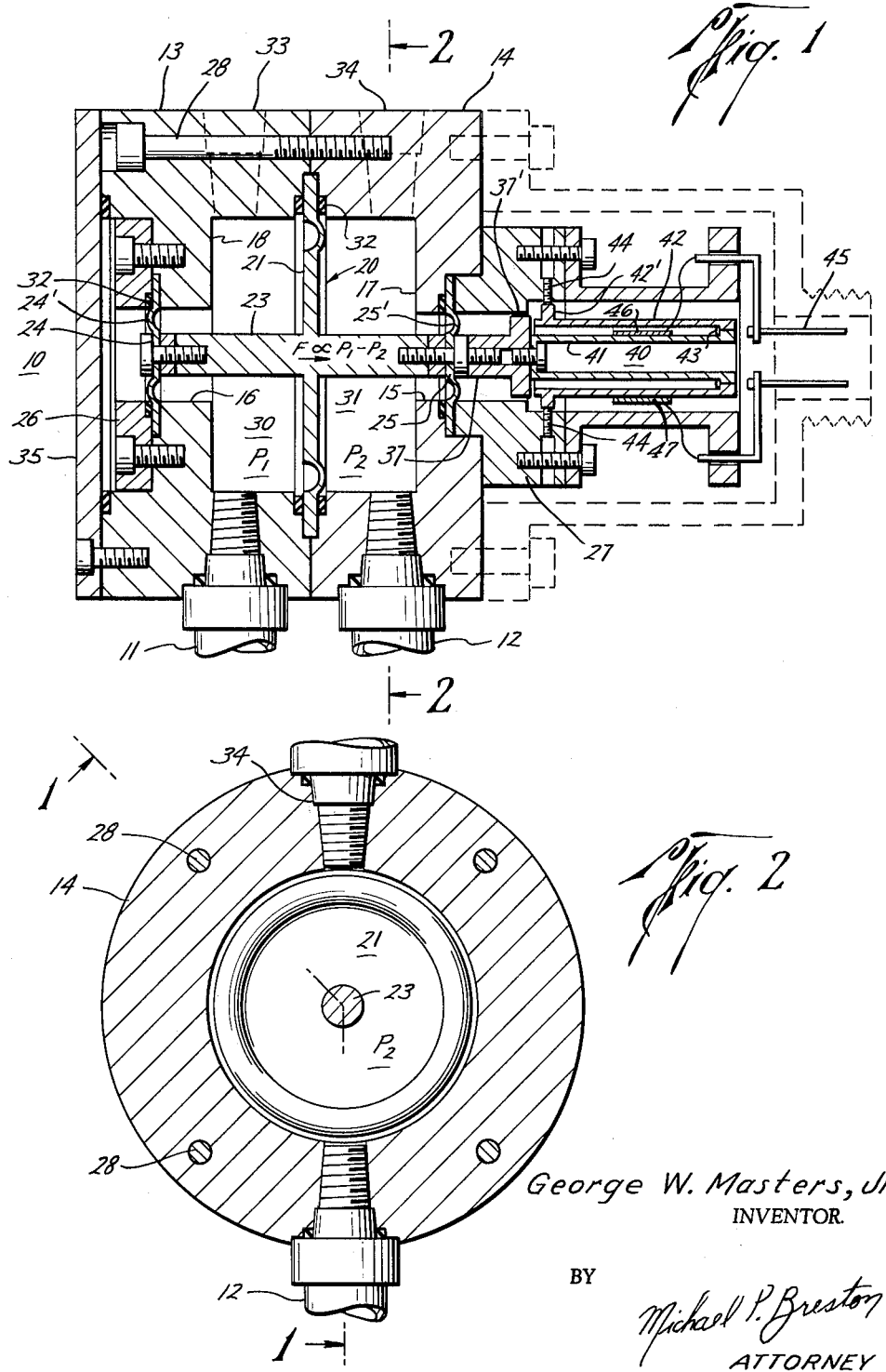

This is a continuation of application Serial No. 205,318, filed June 26, 1962.

This invention relates generally to pressure transducers and more particularly to very accurate differential fluid pressure transducers employing flexible pressure transmitting elements for converting the measured pressures into resultant measurable forces.

Heretofore, practical differential pressure gauges often employed two pressure responsive elements, such as bellows or diaphragms, both rigidly connected by a strut member. It is of course desired that, when the measured pressure differential is substantially equal to zero, the strut undergo no noticeable displacement or produce no appreciable work. To achieve that condition, extreme care was required in making the effective areas of the employed pair of diaphragms identical. The matching of the diaphragms was not only very expensive but in practice almost impossible of achievement. As is well known, a mismatch between the employed diaphragms prevents the obtention of accurate measurements in addition to making the pressure gauge responsive to variations in circumambient conditions such as temperature, pressure, acceleration, shock, vibration, etc.

Accordingly, it is an object of the invention to provide new and improved pressure transducers which are highly sensitive and accurate.

It is another object of the invention to provide new and improved pressure transducers employing a minimum of components and being relatively inexpensive to manufacture.

It is still another object of the invention to provide new and improved pressure transducers which do not require the exact matching of relatively large pressure responsive diaphragms.

It is yet another object of the invention to provide new and improved pressure gauges in which the effects of a mismatch between pressure reponsive elements are substantially eliminated.

It is a further object of the invention to provide new and improved pressure gauges, the output information of which is substantially independent of variations in circumambient conditions.

These and other apparent objects of the invention are accomplished by providing a pressure gauge having two chambers accepting fluids under pressure and being separated by a common pressure responsive element for transforming an existing pressure differential between the fluids into a resultant measurable force. Centrally carried by the common pressure responsive element is a rigid strut carrying at both of its ends relatively small, flexible seals seated in symmetrically situated openings in opposite walls of the chambers. The effective areas of both seals are made substantially identical. However, an existing mismatch therebetween becomes automatically eliminated, during an initial calibration stage, by an increase in the effective area of the smaller seal and by a decrease in the effective area of the larger seal. The change in the respective seals' areas continues, during a relatively short time interval, until the pressure gauge becomes completely balanced. After reaching their state of equilibrium, the flexible seals are fixedly secured and, thereafter, accurate pressure measurements are assured.

The features of the invention which are believed to be novel are set forth with particularity in the appended claims. The invention itself, however, both as to its organization and mode of operation, together with further objects and advantages thereof, may best be understood by reference to the following description taken in conjunction with the accompanying drawings in which:

FIG. 1 is a sectional view in elevation of a preferred pressure gauge embodying the principles of the invention; and FIG. 2 is a plane view taken along line 2—2 of FIG. 1.

Referring now to the drawings, there is disclosed for the purposes of illustrating the invention a pressure gauge, generally designated as 10, for measuring differential pressures between fluids admitted through threaded conduits 11 and 12. The pressure gauge 10 includes a hollow, cylindrical casing made of two half sections 13 and 14. Centrally situated openings or windows 15 and 16 are respectively provided in the opposite, flat walls 17 and 18 of casing 10. Mounted within the inside volume of casing 10 is a pressure sensor 20 comprising a flexible diaphragm 21, connecting linkages, and seals 24 and 25. Forming integral part with diaphragm 21 and being centrally mounted therein is a cylindrical strut 23 at the opposite ends of which are bolted the seals 24 and 25. Preferably seals 24 and 25 should have substantially equal effective areas. However, a mismatch therebetween can be readily eliminated in a manner subsequently described. Seals 24 and 25 have annular thin walls 24', 25', respectively. Walls 24', 25' are pressure formed to have a C-shaped cross-section, as shown. These annular thin walls are readily displaceable in a generally axial direction in response to small forces. Bearing energetically against the outer flanges of seals 24 and 25 are two pressure plates 26, 27, respectively.

The outer rim of flexible diaphragm 21 is sandwiched between both half sections 13 and 14 so that, when the sections are fastened together, as by bolts 28, two fluid receiving chambers 30 and 31 are formed. Chamber 30 is hereinafter referred to as the "high pressure" chamber and chamber 31 as the "low pressure" chamber. Both chambers are rendered fluid-tight by suitable sealing rings 32. Bleed ports 33 and 34 in chambers 30 and 31, respectively, allow for the evacuation of entrapped gases. A suitable protective end cover 35 may be provided for preventing damage to the pressure seal 24.

During an initial calibration period, any mismatch between the effective areas of seals 24 and 25 becomes substantially eliminated. This is accomplished as follows: Assume the effective areas of both seals 24 and 25 to be exactly identical. Then, when the fluid pressure $P_1$ in chamber 30 is equal to the fluid pressure $P_2$ in chamber 31, it is clear that the opposite faces of diaphragm 21 are subjected to equal and opposite resultant forces. Hence, strut 23 is then in a state of equilibrium, in particular, the resultant force F along its longitudinal axis is substantially zero.

Assume now that in machining seals 24 and 25, the effective area of seal 25 is unintentionally made larger than the effective area of seal 24. This disrupts the symmetry of the pressure sensor system 20 and makes strut 23 exert a forming force F against the seal with the assumed larger effective area, that is, seal 25. Because the thin walls 24', 25' are symmetrically positioned relative to the plane containing the main diaphragm 21, when the sensor system 20 moves to the right, the effective area of seal 25 decreases and the effective area of seal 24 increases until both effective areas become substantially equal. Upon achieving a match between the effective areas of seals 24, 25, the sensor system 20 reaches a state of equilibrium whereupon the forming force disappears.

Means, subsequently described, are provided for locking the sensor system 20 in the thusly obtained zero position. It will be appreciated that if the effective area of seal 24 were assumed to be larger than the effective area of seal 25, the sensor 20 would move to the left until both effective areas, as before, became matched. Thereafter, the force F exerted by the strut 23 in an axial direction is substantially linearly proportional to the difference in pressure $\Delta P = P_1 - P_2$. This force F is applied to a force-transmitting-member 37 having an annular flange or shoulder 37'.

To translate force F into an electric signal having a variable parameter proportional to the amplitude of F, known types of force transducers may be employed. A highly sensitive and accurate force transducer, generally designated as 40, which can be readily coupled to member 37, is disclosed in my copending application Serial No. 176,397, filed February 28, 1962 (now abandoned) and entitled "Electric Strain Gauges."

The force transducer 40 comprises a hollow cylindrical inner tube 41 and an outer cylindrical tube 42. One pair of free ends of tubes 41 and 42 is welded together as at 43. The free end of hollow tube 41 is threadably secured to member 37, whereas the free end of tube 42 is provided with an annular flange 42' fastened to the stationary pressure plate 27 by two set screws 44. Each of tubes 41 and 42 carries at least one but preferably two strain sensitive windings 46, 47 connected to connector 45.

In operation, during the above described calibration procedure, the set screws 44 are loosened to allow for the axial displacement of strut 23. Upon achieving a state of equilibrium, that is when the motion of the sensor system 20 ceases, set screws 44 are tightened against flange 42'. Then, whenever the pressure $P_1$ in chamber 30 exceeds the pressure $P_2$ in the chamber 31, strut 23 will exert a force F proportional to the difference in pressure $\Delta P = P_1 - P_2$. This force F bears against the inner tube 41 of transducer 40 placing it in compression and the outer tube 42 in tension. As a result, the resistance of the strain sensitive windings changes. The measuring network, typically a Wheatstone bridge circuit, in the arms of which are placed the strain sensitive windings, reflects the resultant resistance changes and provides an output electric signal proportional to force F and, hence, to the pressure differential $\Delta P$.

It will be appreciated that in the apparatus of the invention variations in circumambient conditions such as temperatures, for example, do not appreciably affect the accuracy of the obtained pressure measurements, inasmuch as a modification in the effective area of the main diaphragm 21 results in no net force F on strut 23 when the pressures in chambers 30, 31 are equal. It will be also noted that the action of the annular flange 37' against the outer tube 42 avoids damaging the force transducer 40 and hence the sensor 20 upon the occurrence of exceedingly high pressures in the high pressure chamber 30. A similar arrangement could be readily provided, if desired, to protect the sensor 20 against exceeding pressures in the low chamber 31.

While I have illustrated and described the best form of a preferred embodiment of my invention, it will be apparent to those skilled in the art that changes may be made in the form of the apparatus without departing from the spirit of my invention as set forth in the appended claims.

What is claimed is:

1. In a pressure gauge: a casing comprising two units, a relatively large pressure responsive element mounted within said casing and separating said units for defining two chambers adapted to accept fluids under pressure, a strut member axially mounted in said element and movable therewith for transmitting a force dependent upon a difference in pressure between the fluids in said chambers, a first relatively small flexible seal mounted on one end of said strut member, a second relatively small flexible seal mounted on the other end of said strut member, said seals being responsive to a difference in pressure between said fluids in said chambers whereby said force exerted by said strut member bears aaginst one of said seals, said first and second flexible seals being arranged to assume equal effective areas when the pressures in said chambers are equal; means attached to said strut member for determining the force applied to said strut member by said element, and means for releasably locking said strut member and force determining means in a fixed position, said position representing a reference pressure.

2. In a pressure transducer defining a high pressure chamber and a low pressure chamber, each chamber adapted to accept fluids under pressure, a pressure responsive element constituting a common flexible wall for said chambers, said element being responsive to a difference in pressure between the fluids in said chambers, a strut member axially mounted in said element and moveable therewith, said strut member having at each of its ends a flexible seal whereby the force exerted by said strut member is substantially linearly related to said pressure difference, each of said flexible seals changing its effective area exposed to said chambers upon shifting movement of said strut member in said chambers, means for releasable locking said strut member in shifted position representing a reference pressure, and means for determining the force applied to said strut member by said element after said strut member is locked in said position.

3. In a pressure transducer defining a high pressure chamber and a low pressure chamber, each chamber adapted to accept fluids under pressure, a pressure responsive element constituting a common flexible wall for said chambers, said element being responsive to a difference in pressure between the fluids in said chambers, a strut member axially mounted in said element and movable therewith, said strut member having at each of its ends a flexible seal whereby the force exerted by said strut member is substantially linearly related to said pressure difference, said seals being symmetrically disposed in opposite walls of said chambers whereby the effective area of one seal increases and the effective area of the other seal decreases when the effective areas of both seals are unequal and substantially equal pressures exist in both of said chambers, means for releasable locking said strut member in a fixed position when equal pressures exist in both of said chambers, and strain gauge means for determining forces applied to said strut member by said element after said strut member is locked in said position.

4. In a pressure transducer, a housing having a pair of chambers adapted to accept fluids under pressure, a pressure responsive element constituting a common flexible wall for said chambers, strut means movably mounted on said element and extending into each of said chambers, flexible seal means in each of said chambers and attached to said strut means whereby a force is applied to said strut means which is substantially related to a difference in pressure between said chambers, each of said flexible seal means being arranged to present equal effective areas to said chambers when the pressures in said chambers are equal, means forming a part of said strut means for determining the force applied to said strut means by said element, and means for releasably locking said strut means in a position representing a reference pressure.

5. In a pressure transducer defining a high pressure chamber and a low pressure chamber, each chamber being adapted to accept a fluid under pressure, said transducer comprising: a pressure responsive element constituting a common flexible wall for said chambers, said element tending to move in response to a difference in pressure between the fluids in said chambers, a strut member axially mounted in said element, said strut having at each of its extremities a flexible end seal whereby the force exerted by said strut on said end seals is substantially linearly related to said difference in pressure, stress sensitive means comprising an elongated inner tubular member and an elongated outer tubular member, said outer tubular member being concentrically positioned about said inner tubular member and having one of its ends fixedly secured to one end of said inner tubular member, the other end of said inner tubular member being coupled to one end of said strut member, each of said end seals having a configuration adapted to change its effective area upon axial displacement of said strut member in said chambers when calibrating said transducer, and means for releasably locking the other end of said outer tubular member in a fixed position to calibrate said transducer, said stress sensitive means including means for determining the stresses in said tubular members developed by said strut member in response to a difference in pressure between said chambers after locking said outer tubular member in a fixed position.

6. In a pressure transducer defining a high pressure chamber and a low pressure chamber, each chamber adapted to accept a fluid under pressure, a pressure responsive element constituting a common flexible wall for said chambers, said element tending to move in response to a difference in pressure between the fluids in said chambers, a strut member axially mounted in said element, said strut member having at each of its extremities a flexible end seal symmetrically disposed in opposite walls of said chambers whereby the force exerted by said strut member is substantially linearly related to said difference in pressure, force determining means including first and second stress sensitive members arranged in a parallel spaced relationship, said stress sensitive members being parallel to said strut member, said first stress sensitive member having one of its ends connected to one end of said second stress sensitive member, the other end of said first stress sensitive member being connected to said strut member, said end seals having a configuration adapted to change their effective area exposed to said chambers when the effective areas of both seals are unequal and substantially equal pressures exist in both of said chambers, means for releasably locking the other end of said second stress sensitive member in a fixed position when equal pressures exist in both of said chambers, and means for determining the forces applied to said stress sensitive members by said strut member when said second stress sensitive member is locked in a fixed position.

7. In a pressure transducer defining a high pressure chamber and a low pressure chamber, each chamber adapted to accept fluids under pressure, a pressure responsive element constituting a common flexible wall for said chamber, said element tending to move in response to a difference in pressure between the fluids in said chambers, a strut member axially mounted in said element, said strut member having at each of its extremities a flexible end seal whereby the force exerted by said strut member is substantially linearly related to said difference in pressure, a stress sensitive member connected to one end of said strut member, said end seals having a configuration adapted to change their effective area exposed to said chambers when the effective areas of said end seals are unequal and substantially equal pressures exist in both of said chambers, means for releasably locking a portion of stress member in a fixed position when equal pressures exist in both of said chambers, and means for determining the forces applied to said stress member by said strut member when said portion of said stress member is locked in a fixed position.

References Cited by the Examiner
UNITED STATES PATENTS

| | | | |
|---|---|---|---|
| 2,691,893 | 10/1954 | Meyer | 73—407 |
| 2,844,034 | 7/1958 | Statham | 73—398 |
| 3,085,437 | 4/1963 | Osterstrom | 73—407 |

LOUIS R. PRINCE, *Primary Examiner.*

DONALD O. WOODIEL, *Assistant Examiner.*